Feb. 20, 1934.    E. N. CUNNINGHAM    1,947,759
TWISTED FIBROUS RUBBER PRODUCT AND METHOD OF MAKING THE SAME
Filed April 5, 1933
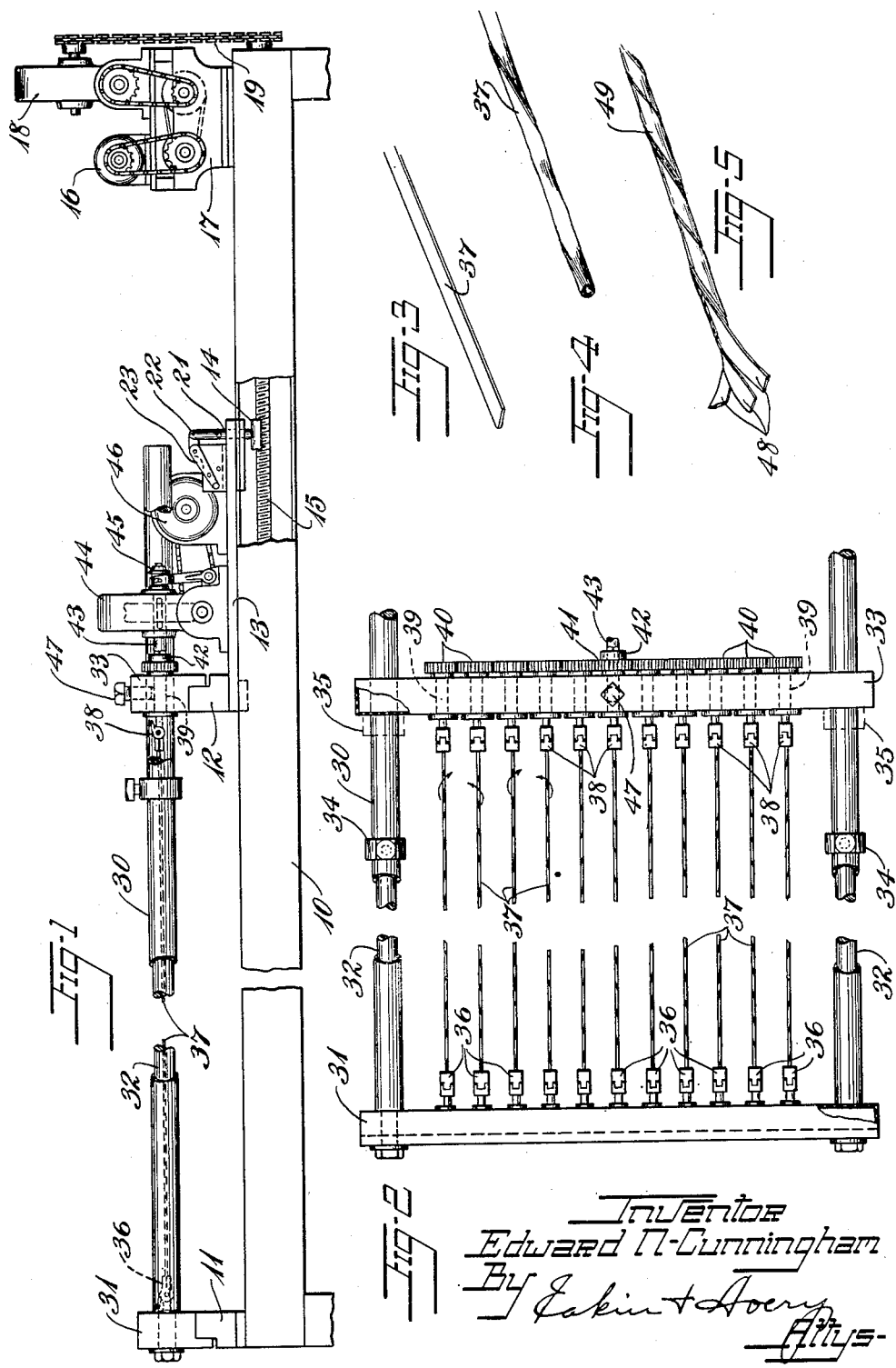

Patented Feb. 20, 1934

1,947,759

UNITED STATES PATENT OFFICE 1,947,759

TWISTED FIBROUS RUBBER PRODUCT AND METHOD OF MAKING THE SAME

Edward N. Cunningham, Akron, Ohio, assignor to The B. F. Goodrich Company, New York, N. Y., a corporation of New York Application April 5, 1933. Serial No. 664,526

20 Claims. (Cl. 18—53)

This invention relates to a novel fibrous rubber thread and to a method of producing the same, and has for its principal object the manufacture of a substantially round rubber thread of fibrous character exhibiting extremely high tensile strength, low ultimate elongation, and an extraordinary degree of resistance to corrosive chemicals, and which may readily be woven into fabrics using conventional looms and other textile machinery.

The invention comprises twisting strip rubber to produce a twisted or helically rolled, effectively round thread, stretching the rubber to several times its original length, and subjecting the twisted and stretched rubber to the action of an appropriate vulcanizing agent, such as sulphur chloride vapor. The rubber, upon being stretched, acquires a fibrous anisotropic structure which may be temporarily fixed by cooling (producing the so-called "racked" rubber), but upon being warmed it retracts to approximately its original shape and loses its fibrous structure. The treatment of the rubber with a vulcanizing agent, however, fixes its structure permanently, so that it does not lose its twisted fibrous character even when heated up to the temperature of boiling water.

In one embodiment of the invention, a sheet of unmasticated rubber about 0.005 inch thick is prepared by drying a film of rubber latex on a suitable supporting surface. The sheet is cut into strips about 0.25 inch wide and each of the strips is twisted until it assumes an effectively round cross-section, for example, about a hundred turns or twists to the inch, and is stretched to an elongation just short of that required to rupture it, say to about ten times its original length so that in the stretched state there are about ten twists to the inch. The twisted and stretched strips are placed in a chamber containing air saturated with the vapors of sulphur chloride for a period of about an hour. After standing in the ordinary atmosphere for several hours to permit the absorbed sulphur chloride to react completely, the product is examined and is found to retain its stretched length and applied twist substantially unchanged, and to exhibit a pronounced fibrous structure in the direction of its original elongation. The product is quite flexible and will withstand considerable bending without breaking; it exhibits a remarkably high resistance to rupture, and a very low ultimate elongation, but by virtue of its helical, spring-like structure, it is sufficiently stretchable to serve admirably as a substitute for textile threads.

Samples of products made as above described when tested, show ultimate tensile strengths of from 15,000 to 20,000 lbs. per sq. in. and ultimate elongations of only about 25%. The effectively round cross-section or circumference of the twisted thread adapts it for use in ordinary textile machinery of conventional design for weaving or otherwise fabricating products from the thread.

The vulcanization may be carried out at any temperature over a wide range, temperatures varying from 0° to 85° C. having been employed, although either lower or higher temperatures may be used, particularly when vulcanized rubber is employed, as is described below. The lower temperatures are generally preferred because of an increased stability of the sulphur chloride and because the plastic flow of the rubber at low temperatures is less and the true elongation attainable is consequently somewhat greater. The time of vulcanization should be sufficient to develop the full strength of the product and will vary depending upon the thickness of the sample, temperatures, concentration of vulcanizing agent, etc., from fifteen or twenty minutes to two hours, but a prolonged exposure does no appreciable harm, since the rubber is apparently fully saturated with the vulcanizing agent in that time, and is not subject to a further change. The characteristic final properties of the product are not immediately developed, but apparently require a considerable period after exposure to the sulphur chloride. The moisture of the atmosphere seems to have some influence on the reaction, since the retraction of the vulcanized product on heating is greater if it is maintained in perfectly dry air. If desired, the vulcanized product may even be dipped in dilute ammonia solution, the water of which apparently assists in developing the properties characteristic of the product, while the ammonia serves to neutralize the acid which may be formed by decomposition of the sulphur chloride.

Calendered strips of masticated unvulcanized rubber cannot be treated in the same manner as the unmasticated latex rubber described above, for the mastication destroys the resiliency of the rubber and makes it plastic, so that no considerable true "reversible" elongation is attainable. However, the masticated rubber may be used if its retractibility is restored by vulcanization. Certain ingredients, particularly basic substances, retard the action of sulphur chloride, hence the time required for the treatment of stretched soft vulcanized rubber must be separately determined for each different vulcanized composition. The preliminary vulcanization may be carried out by any convenient means, by sulphur, either with or without accelerators, or by sulphur chloride itself, but should be so regulated as to permit a high degree of extension before the final treatment with sulphur chloride.

The rubber which is treated in accordance with this invention preferably should be in strips sufficiently thin that sulphur chloride may readily penetrate their entire thickness and effect a uniform vulcanization. If the thickness greatly exceeds 0.01 inch the vulcanization tends to be superficial with the center of the rubber still substantially unaffected, but thicker samples may be vulcanized if care is exercised to secure complete penetration of the sulphur chloride.

The sulphur chloride which is preferably employed in the practice of this invention is the ordinary sulphur monochloride such as is used as a vulcanizing agent in the rubber industry. It is preferably employed in the vapor form rather than as a solution in an organic solvent, because of the detrimental effect of such solvents on highly stretched rubber. However, the invention is not necessarily limited to this one vulcanizing agent, but other substances capable of a true vulcanization of rubber to a comparatively inextensible product, such as hydrogen persulphide or phosphorus sulphide, or even elemental sulphur when used with appropriate accelerators, may be substituted therefor. Substances which do not exert a true vulcanizing action, such as the halogens, do not give rise to the products herein described.

Various forms of apparatus may be used in practicing the present invention, the principal requirements being that the apparatus shall be capable of producing a uniform twist in the rubber, elongating it to the desired extent, and holding it in the twisted and stretched condition until vulcanization can be effected. Such apparatus is illustrated in the accompanying drawing in which Fig. 1 is a diagrammatic side elevation of one form of apparatus suitable for use in practicing the present invention, certain parts of the apparatus being broken away for clarity of illustration.

Fig. 2 is a plan view of a portion of the apparatus of Fig. 1.

Fig. 3 is a perspective view of a strip of rubber before it is stretched and twisted.

Fig. 4 is a perspective view of a finished product of the present invention.

Fig. 5 is a perspective view of a fibrous rubber thread embodying the invention in a modified form.

The particular apparatus illustrated comprises a principal rectangular frame 10 having a fixed channeled header support 11 mounted across one end thereof and a similar parallel header support 12 mounted upon a carriage 13 adapted to slide along the frame 10 when propelled by means of apparatus comprising a screw cap 14 engaging a rotating screw 15 which extends down the center of the rectangular principal frame. The propelling screw is rotated by a motor 16 which drives an intermediate variable speed control unit 17, gear reduction unit 18, and sprocket chain 19 all mounted at one end of the main frame. The screw cap 14 is supported by a sliding pin 21 connected through a link motion 22 to a handle 23 in such manner that by manually operating the handle, the screw cap may be caused to engage or disengage the driving screw at will and so control the motion of the carriage 13.

Detachably mounted upon the main frame and resting particularly upon the header supports, is an auxiliary or stretching frame 30, all parts of which are made of or coated with material resistant to the vulcanizing vapors employed in the process. The stretching frame comprises a fixed rubber covered header 31, parallel side rods 32, likewise rubber covered, and a movable header 33 also rubber covered and adapted to slide along the side rods. Adjustable locking collars 34 may be set behind the movable header as indicated by the dotted lines at 35 to hold it any desired position along the side arms against the tension of the rubber strips, hereafter to be described. Mounted along the stationary header are a series of clamps 36 adapted to hold the ends of rubber strips 37, and a series of similar clamps 38 are secured to small shafts 39 which are rotatably mounted along the movable header. Each of the shafts carries a small bakelite spur gear 40 which meshes with the adjacent gears so that the entire series of clamps upon the movable head may be rotated by driving any one of the series, such as the gear 41 which is fitted with a socketed hub 42 into which may be inserted a square drive shaft 43 driven through a reduction unit 44, and clutch 45 by a motor 46, which are mounted upon the sliding carriage 13.

In operating the apparatus, the movable header is placed near the fixed header and rubber strips of appropriate lengths are secured in the clamps, one end of each strip being secured to a fixed clamp and the other end to a corresponding movable clamp. The two motors are then started and the sliding carriage together with the movable header is pulled away from the fixed header thereby stretching the rubber, and a the same time, the several strips are uniformly twisted. The operation is continued until the strips have been stretched and twisted to a desired extent, and then the motors are stopped, the locking collars 34 are set against the movable header to hold the rubber in its stretched condition, and a set screw 47 in the movable header at one of the rotating shafts is tightened to prevent further rotation of the twisting clamps. The entire auxiliary or stretching frame then is lifted from the main frame and placed in a vulcanizing chamber where the stretched and twisted rubber is vulcanized in the manner described. When the vulcanizing reaction is completed, the finished threads may be removed from the apparatus.

Variations in the procedure may be practiced, and in many cases it will in fact be desirable to stretch the rubber wholly or in part of the total desired amount before it is twisted, or vice versa, instead of stretching and twisting simultaneously as has been described. For example, if the particular rubber compound in use tends to chafe easily, the strip should first be stretched and then twisted to eliminate the rubbing of one twist over the next which in some cases occurs in stretching a previously twisted strip. Such variations in procedure are readily effected with the present apparatus in which the stretching and twisting means may be operated either independently or simultaneously, at will.

No definite rule regarding the correct amount of twist to apply to the strip can be laid down, but this must be determined by the exercise of judgment in each particular case. Generally it may be said that the strip should not be twisted enough to cause the twists to "pile up", but only enough to cause it to assume the desired configuration in the stretched condition.

In a modification of the invention a plurality of rubber strips 48 are twisted together, stretched, and vulcanized in the manner described to produce a cable-like thread 49 of increased tensile strength possessing all the fibrous qualities described, which is particularly useful where long reliable service is required, since the breaking of a single strand will not cause a complete failure of the thread.

It is apparent that rubber strips having square or other polygonal cross-sections than the rectangular strip illustrated, and even circular or similar cross-sectional strips may be employed in the invention to produce useful twisted fibrous rubber thread, although the thin flat strip is generally more uniformly vulcanized and consequently most satisfactory for commercial use. If a relatively thin or flat strip of rubber twisted and stretched, it will generally assume the form of a helically wrapped tube of small diameter as illustrated in Fig. 4 and will be substantially circular in external cross-section at any point in its length. If a square thread is twisted, however, it will usually not form such a tube and a true cross-section through the thread will not be circular, but the closely twisted spirals formed by the edges of the square thread will impart to it an effectively round shape. Accordingly the term "effectively round" or "effectively circular" as used herein in describing the twisted product of the invention refers to its effective cross-sectional configuration and not necessarily to a true or actual cross-section through the product.

The products of this invention may be used for any purpose where such flexible, strong, slightly extensible round the threads are required, but are particularly adapted to uses for which the ordinary textile threads are unsuited because of their chemical reactivity. The fibrous products of this invention are extremely resistant to corrosive chemicals, including all the common alkalies and acids with the exception of strong oxidizing acids. Nor do they deteriorate unduly with age, as does soft rubber vulcanized with sulphur chloride. However, their resistance to deterioration may be still further increased by treating them with anti-oxidants or with anti-acids such as solutions of sodium hydroxide, calcium hydroxide, sodium carbonate and like inorganic basic materials or with organic or nitrogenous bases, including for example, ammonia, triethanolamine, meta-phenylene diamine, etc.

Numerous modifications and variations both in apparatus and procedure may be made in the invention as hereinabove described without departing from the spirit and scope of the discovery as defined in the appended claims.

I claim:

1. The process which comprises stretching and twisting rubber, and vulcanizing the stretched and twisted rubber to a point at which it permanently retains the major part of its elongation and twist together with the anisotropic structure imparted to it by the stretching.

2. The process which comprises stretching and twisting rubber, and vulcanizing the stretched and twisted rubber with a cold vulcanizing agent to a point at which it permanently retains the major part of its elongation and twist together with the anisotropic structure imparted to it by the stretching.

3. The process which comprises stretching and twisting rubber, and vulcanizing the stretched and twisted rubber with a vulcanizing agent selected from the group consisting of compounds of sulphur with hydrogen, phosphorus, and chlorine, to a point at which it permanently retains the major part of its elongation and twist together with the anisotropic structure imparted to it by the stretching.

4. The process which comprises stretching and twisting rubber, and vulcanizing the stretched and twisted rubber in sulphur chloride vapor to a point at which it permanently retains the major part of its elongation and twist together with the anisotropic structure imparted to it by the stretching.

5. The process which comprises stretching strip rubber of polygonal cross-section to several times its unstretched length, twisting the rubber strip until its effective cross-section is substantially circular, and vulcanizing the stretched and twisted rubber to a point at which it permanently retains the major part of its elongation and twist.

6. The process which comprises stretching strip rubber of polygonal cross-section to several times its unstretched length and twisting the rubber strip until its effective cross-section is substantially circular, and vulcanizing the stretched and twisted rubber with a cold vulcanizing agent to a point at which it permanently retains the major part of its elongation and twist.

7. The process which comprises stretching strip rubber of polygonal cross-section to several times its unstretched length and twisting the rubber strip until its effective cross-section is substantially circular, and vulcanizing the stretched and twisted rubber with a vulcanizing agent selected from the group consisting of compounds of sulphur with hydrogen, phosphorus, and chlorine, to a point at which it permanently retains the major part of its elongation and twist.

8. The process which comprises stretching strip rubber of polygonal cross-section to several times its unstretched length and twisting the rubber strip until its effective cross-section is substantially circular, and vulcanizing the stretched and twisted rubber in sulphur chloride vapor to a point at which it permanently retains the major part of its elongation and twist.

9. The process which comprises stretching rubber to the maximum practical elongation, twisting the rubber, and vulcanizing the stretched and twisted rubber until it retains the major part of the elongation and twist together with the anisotropic structure imparted to it by the stretching.

10. The process which comprises simultaneously stretching and twisting rubber, and vulcanizing the stretched and twisted rubber until it retains the major part of the elongation and twist together with the anisotropic structure imparted to it by the stretching.

11. The process which comprises preparing a strip of unmasticated latex rubber, stretching and twisting the rubber strip, and vulcanizing the stretched and twisted rubber until it retains the major part of its elongation and twist.

12. The process which comprises stretching and twisting together a plurality of rubber threads to form a cable-like structure, and vulcanizing the stretched and twisted rubber cable until it retains the major part of its elongation and twist together with the fibrous structure imparted to the rubber by the stretching.

13. The process which comprises stretching and twisting together a plurality of rubber threads to form a cable-like structure and vulcanizing the stretched and twisted rubber cable in sulphur chloride vapor until it retains the major part of its elongation and twist together with the fibrous structure imparted to the rubber by the stretching.

14. The process which comprises stretching and twisting rubber, vulcanizing the stretched and twisted rubber with a cold vulcanizing agent to a point at which it permanently retains the major part of its elongation and twist together with the anisotropic structure imparted to it by the stretching, and treating the vulcanized rubber with a basic material.

15. An article of manufacture comprising a twisted strip of vulcanized rubber exhibiting a fibrous anisotropic structure.

16. An article of manufacture having an effectively circular cross-section, comprising a twisted polygonal strip of vulcanized rubber exhibiting a fibrous anisotropic structure, high tensile strength, and low ultimate elongation.

17. An article of manufacture comprising a plurality of entwined strips of vulcanized rubber exhibiting a fibrous anisotropic structure.

18. An article of manufacture prepared by twisting and stretching rubber and vulcanizing the twisted and stretched rubber until it retains the major part of its twist and elongation to produce a twisted rubber product exhibiting a fibrous anisotropic structure.

19. An article of manufacture prepared by twisting and stretching strip rubber and vulcanizing the twisted and stretched strip rubber in sulphur chloride to produce an effectively round rubber thread exhibiting a permanent anisotropic structure.

20. An article of manufacture prepared by stretching and twisting together a plurality of rubber strips and vulcanizing the stretched and twisted strips to produce a cable-like rubber thread of high tensile strength and low ultimate elongation, the rubber of which exhibits a fibrous anisotropic structure.

EDWARD N. CUNNINGHAM.